(12) United States Patent
Sully

(10) Patent No.: US 10,540,080 B2
(45) Date of Patent: Jan. 21, 2020

(54) VISUAL MEDIA CAPTURE AND USER INTERFACE ANIMATION

(71) Applicant: Melissa Sully, Rosebery (AU)

(72) Inventor: Melissa Sully, Rosebery (AU)

( * ) Notice: Subject to any disclaimer, the term of this patent is extended or adjusted under 35 U.S.C. 154(b) by 0 days.

(21) Appl. No.: 15/987,705

(22) Filed: May 23, 2018

(65) Prior Publication Data

US 2018/0341383 A1    Nov. 29, 2018

(30) Foreign Application Priority Data

May 23, 2017    (AU) ................................ 2017901947

(51) Int. Cl.
| | | |
|---|---|---|
| *G06F 3/0485* | (2013.01) | |
| *H04N 7/08* | (2006.01) | |
| *H04N 5/445* | (2011.01) | |
| *H04N 5/232* | (2006.01) | |
| *H04L 12/58* | (2006.01) | |
| *G06T 13/00* | (2011.01) | |
| *G06F 3/0481* | (2013.01) | |
| *G06T 13/20* | (2011.01) | |
| *G06F 3/0488* | (2013.01) | |

(52) U.S. Cl.
CPC ............ *G06F 3/0485* (2013.01); *G06T 13/00* (2013.01); *H04L 51/10* (2013.01); *H04L 51/24* (2013.01); *H04L 51/32* (2013.01); *H04N 5/23206* (2013.01); *H04N 5/23216* (2013.01); *H04N 5/23293* (2013.01); *H04N 5/44504* (2013.01); *H04N 7/0806* (2013.01); *G06F 3/0481* (2013.01); *G06F 3/04883* (2013.01); *G06T 13/20* (2013.01); *G06T 2200/24* (2013.01)

(58) Field of Classification Search
CPC .. G06F 3/0485; G06F 3/04883; G06F 3/0481; G06T 13/00; G06T 13/20; G06T 2200/24; H04N 5/23206; H04N 5/23293; H04N 5/23216; H04N 5/44504; H04N 7/0806; H04L 51/32; H04L 51/24; H04L 51/10
See application file for complete search history.

(56) References Cited

U.S. PATENT DOCUMENTS

2011/0249073 A1* 10/2011 Cranfill .................. H04N 7/147
                                                                                    348/14.02
2018/0146161 A1*  5/2018 Kang ..................... H04N 7/147

* cited by examiner

*Primary Examiner* — Lin Ye
*Assistant Examiner* — Tuan H Le
(74) *Attorney, Agent, or Firm* — Innovation Capital Law Group, LLP; Vic Lin

(57) ABSTRACT

Methods for the capture, messaging and graphical user interface display of visual social media use electronic devices, especially small form factor electronic devices, each in operable communication with social media servers. The electronic devices comprise media capture controllers for the capture of visual media using image sensors and messaging controllers for sending notifications of such at least one further electronic devices. The further electronic device may similarly use the media capture controller to capture further visual media which is then uploaded to a social media server. The social media server links the first visual media and the further visual media in a linked image post object. The linked image post object may display the first visual media and the display controller may generate a user interface animation to substitute the first visual media with the further visual media substantially in place within the same display region of the display.

9 Claims, 7 Drawing Sheets

VISUAL MEDIA CAPTURE AND USER INTERFACE ANIMATION

FIELD OF THE INVENTION

This invention relates generally to improvements in the capture, messaging and graphical user interface display of visual social media using small form electronic devices.

BACKGROUND OF THE INVENTION

FIG. 1 illustrates a typical graphical user interface 100 and FIG. 2 illustrates a typical process 200 of prior art social media posting.

The interface 100 comprises a news feed 101 comprising a plurality of posts in reverse chronological order. News feed 100 may comprise a lead post 102 by a first user and an associated plurality of reply posts 103 by other users in reply to the lead post 102. Each post 102 may comprise visual media 104 and may also comprise associated descriptive meta data 105. Users may be tagged in relation to each post 102, 103 with user tags 106. Categorisation hashtags (not shown) may also be associated with each post 102, 103.

The typical process 200 comprises the user capturing an image at step 201 using their mobile phone device and authoring a post at step 202. Authoring may comprise adding the associated meta data 105, tags 106 and the like at step 203.

At step 204, the post is uploaded to the social media server for inclusion within news feed post 101 at step 205.

Friends and tagged users may be notified by in-app notifications at step 206 and may view 207 the post in their own newsfeeds 101 at step 207. These other users may similarly add and upload post content at step 208 which updates 209 the news feed 101 with the various reply posts 103.

However, these graphical user interfaces 100 are problematic for the small electronic displays typical of mobile devices. As can be seen from FIG. 1, typical interfaces 100 require use of vertical scrollbars 106 to scroll through the various reply posts 103. Furthermore, given the limited screen size available, reply posts 103 are usually displayed in smaller format as compared to the main post 102, thereby being difficult to view clearly.

A need therefore exists to allow for the display of information in posts but does not require scrolling, page refreshes and the like.

Furthermore, it is difficult to group relevant content together using these graphical user interfaces 100 which rather simply display content in reverse chronological order. As such, these interfaces 100 may comprise the interposed display of unrelated content from other users, requiring the user to scroll between posts 102, 103 to view the relevantly-related content. Some social media platforms allow hashtags filtering for the grouping together of relevantly-related content. However, hashtag filtering is not generally employed for the reverse chronological posts of conventional newsfeeds 101.

A need therefore exists to allow the coherent display of related visual media without having to use hashtag filtering or the like.

Furthermore, prior art posting 200 is inherently suited for group/multicast communication and is not suited for bidirectional electronic communication between users, requiring users to resort to other means for such, such as instant messaging, email communication and the like.

A need therefore exists to allow for bidirectional communications between users using social media posts.

It is to be understood that, if any prior art information is referred to herein, such reference does not constitute an admission that the information forms part of the common general knowledge in the art, in Australia or any other country.

SUMMARY OF THE DISCLOSURE

There is provided herein improvements in the capture, messaging and graphical user interface display of visual social media using electronic devices, especially small form factor electronic devices, each in operable communication with social media servers.

The electronic devices comprise media capture controllers for the capture of visual media using image sensors and messaging controllers for sending notifications of such at least one further electronic devices.

The further electronic device may similarly use the media capture controller to capture further visual media which is then uploaded to a social media server. The social media server links the first visual media and the further visual media in a linked image post object which can be displayed in a social news feed or other suitable interface.

Each electronic device further comprises a display controller which displays the linked image post object and is responsive to user interface interaction, (such as by way of haptic user interaction of a touchscreen). Specifically, the linked image post object may display the first visual media and, when receiving the haptic user interaction therewith, the display controller may generate a user interface animation to substitute the first visual media with the further visual media substantially in place within the same display region of the display.

In this way, the user need not scroll the graphical user interface to view the further visual media as is the case of prior art interfaces which would display the further visual media in reverse chronological order a linear manner requiring scrolling.

Furthermore, the present method allows for the aggregation of appropriately related visual media by linking the user provided visual media within the linked image post object as opposed to prior art interfaces which may be cluttered with unrelated content rendering them difficult to ascertain, requiring scrolling and the like or the utilisation of hashtags filtering for display of related content.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figures 1, 2:
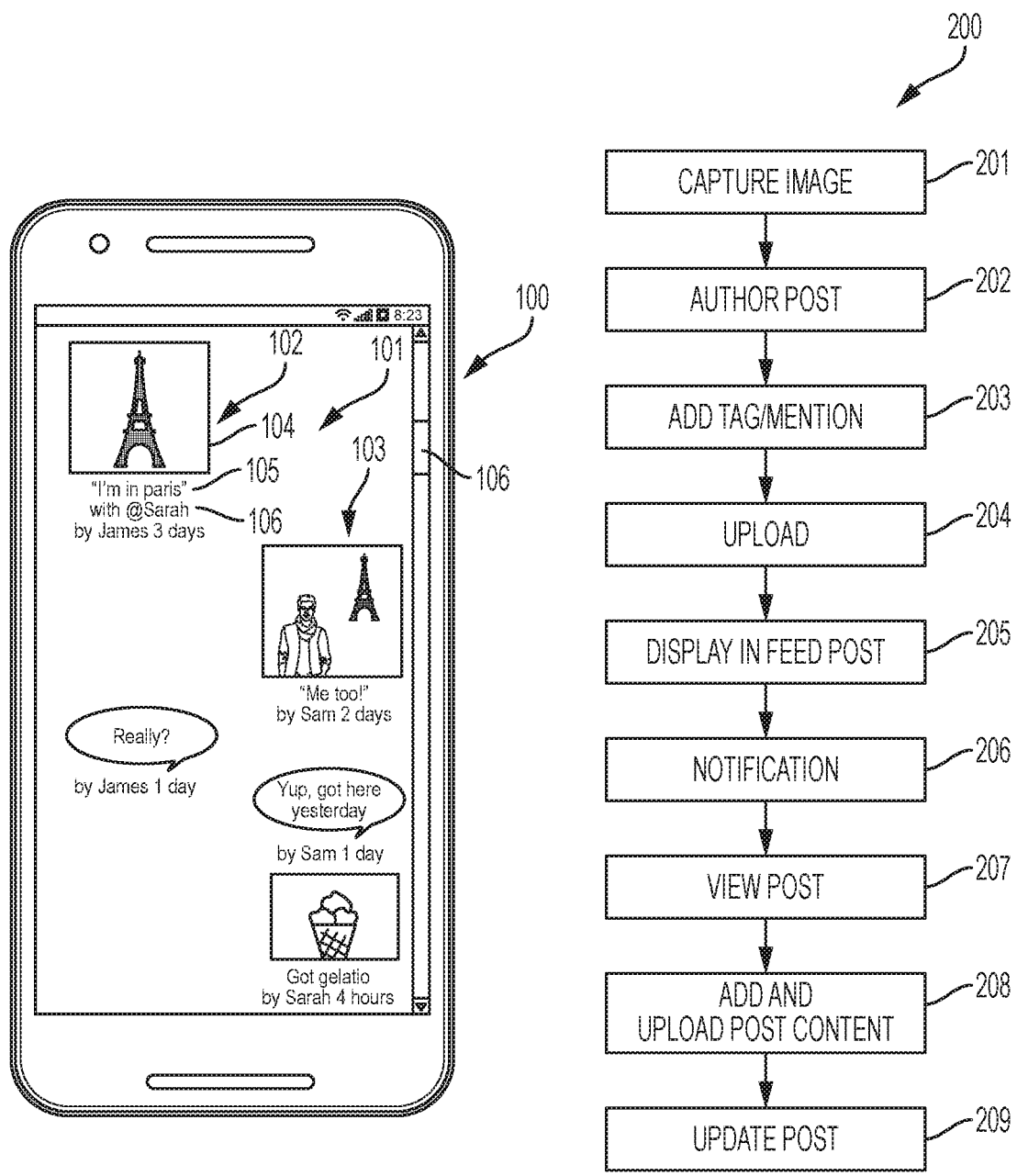
FIG. 1 illustrates an exemplary prior art social media news feed interface.
FIG. 2 illustrates an exemplary an exemplary social media posting process.
Figure 3:
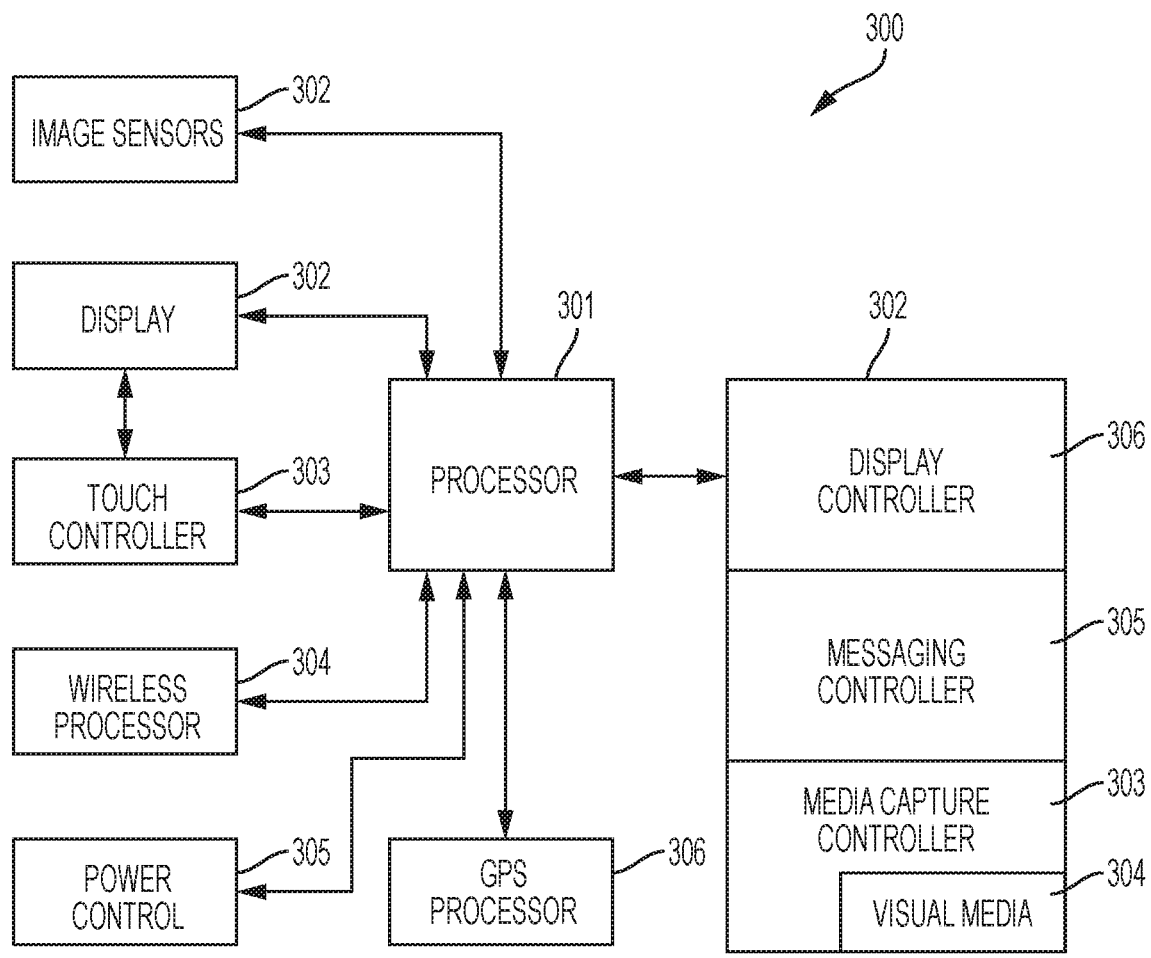
FIG. 3 illustrates an electronic device in accordance with an embodiment.

FIG. 3 illustrates an electronic device 300 which, in embodiments, may take the form of a mobile communication device, especially one with a limited screen size.

The device 300 comprises a processor 301 for processing digital data. In operable communication with the processor 301 across a system bus is a memory device 302. The memory device 302 is configured for storing digital data, including computer program code instructions. In use, the processor 301 fetches the computer program code instructions from the memory device 302 for interpretation and execution.

The device 300 may comprise image sensors 302 for the capture of visual media, such as images and video visual media. The image sensors 302 may comprise a charged couple devices (CCD) sensor array.

The device 300 further comprises a digital display 302 for the display of digital information thereon. A haptic touch controller 303 may be overlaid the digital display 302 for the haptic receipt of user interface gestures in relation to digital information displayed by the display device 302.

The device 300 may further comprise a wireless processor 304 for sending and receiving data wirelessly across Wi-Fi, GSM and the like data networks. A power controller 305 may manage the power supply of the device 300. In embodiments, the device 300 may comprise a GPS processor 306 for ascertaining the location of the device 300.

The computer program code instructions have been shown as having been divided logically into various controllers in the memory device 302 for implementing the various processing of the electronic device 300 described herein.

Specifically, the computer program code instructions may comprise a media capture controller 303 configured for capturing and storing visual media 304 using the image sensors 302. The controllers may further comprise a messaging controller 305 for sending electronic messages to other electronic devices 300.

Furthermore, the computer program code instructions may comprise a display controller 306 for the display of visual media displaying graphical user interfaces and visual media transition animations in the manner described in further detail hereunder.

Figure 4:
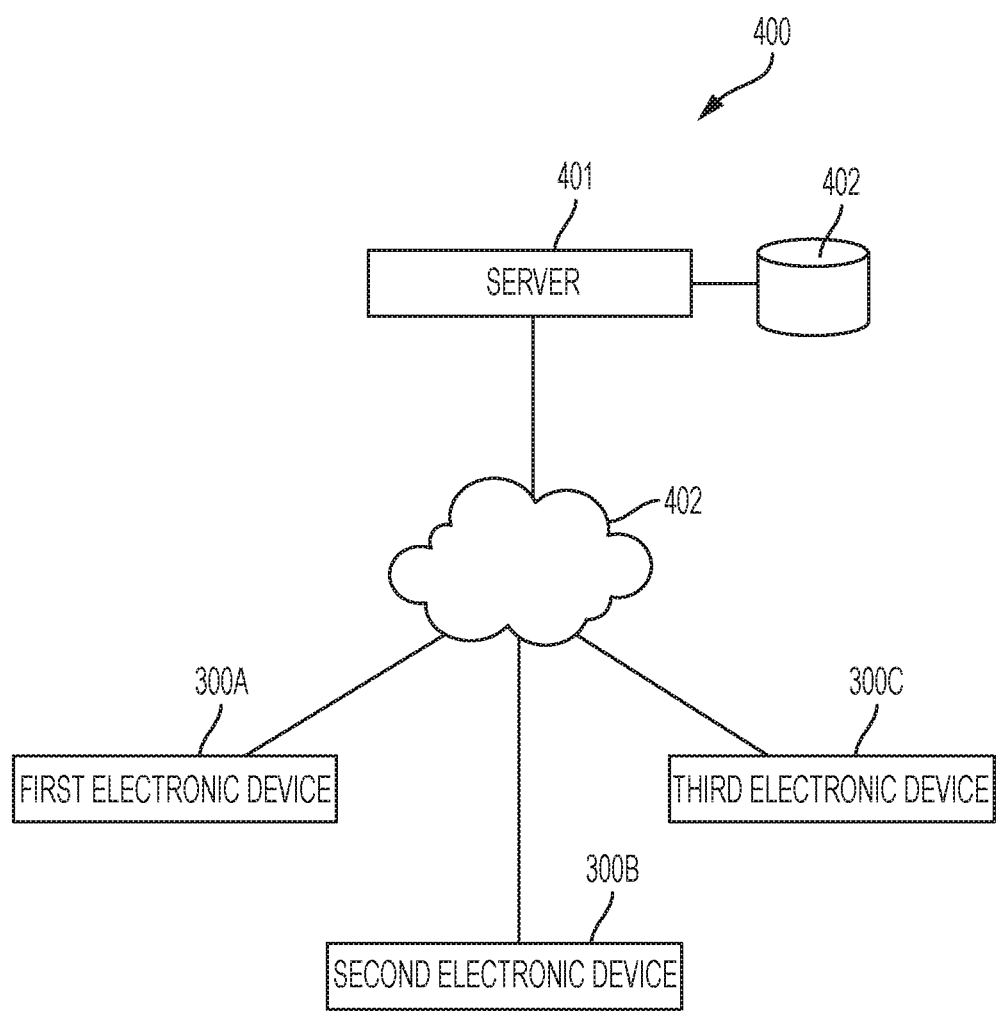
FIG. 4 illustrates a social media network in accordance with an embodiment.

FIG. 4 illustrates a social media network 400 comprising a social media server 401 in operable communication with a plurality of electronic devices 300 across a computer data network 402, such as the Internet. For illustrative convenience, the electronic devices 300 are displayed as first, second and third electronic devices 300. The server 401 maintains a database 402 of relevant information, including social user account data and visual media 204 stored in relation thereto.

Figure 5:
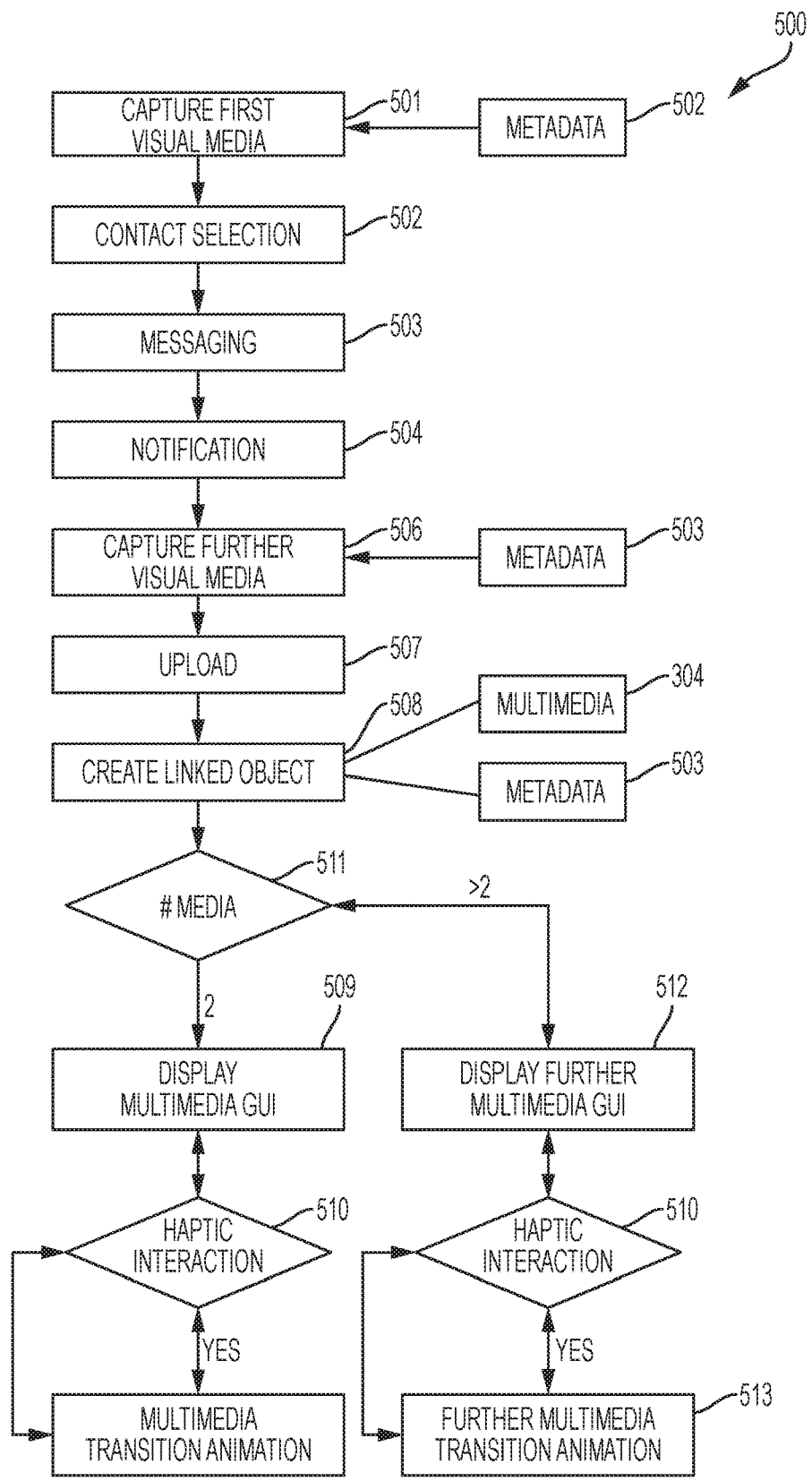
FIG. 5 illustrates exemplary processing by the electronic device and social media networks for the messaging, aggregation and display of visual media in accordance with an embodiment.

FIG. 5 illustrates processing of the network 400 and the constituent electronic devices 300 for social media visual media messaging, aggregation and display.

The processing 500 comprises the first electronic device 300A capturing first visual media at step 501. Capturing first visual media 501 may comprise using the image sensors 302 of the electronic device 300 to capture the visual media 304 using the media capture controller 303. Alternatively, visual media 304 may be selected from the memory device 302.

Figure 6:
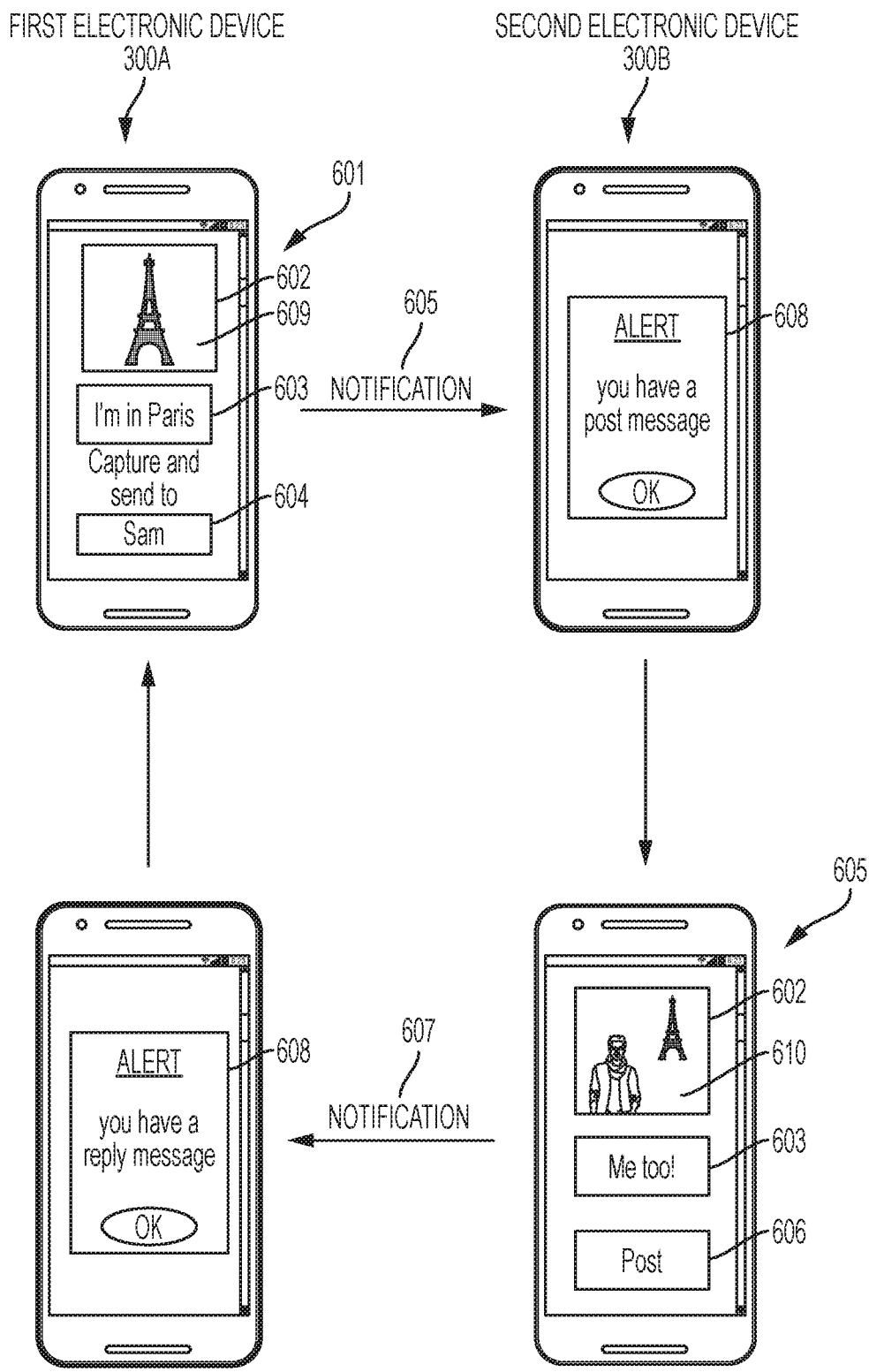
FIG. 6 illustrates exemplary graphical user interfaces for the messaging, aggregation and display of visual media in accordance with an embodiment.

FIG. 6 illustrates an exemplary interface 601 for the capture of the visual media. The interface 600 comprises an electronic viewfinder 602 within which the view of the image sensors 302 may be displayed. Input field 603 may be utilised for the input of associated meta data 502 including descriptive meta data, user tags and the like. In the example, the user has captured first visual media 609.

At step 502, the user may make a contact selection. As is shown in the exemplary interface 601, a contact drop-down selection 604 is displayed for the making of the contact selection. In this example, the first user (James) selects a second user (Sam) associated with the second electronic device 300B.

At step 503, an electronic message 605 is sent to the second electronic device 300B which may be displayed at step 504 by way of an alert 608. The electronic message 605 may take the form of a push notification such that the second user receives substantial real-time notification thereof.

At step 505, the second user, using the second electronic device 300B captures further visual media 610 and associated meta data 503. As can be seen from FIG. 6, the second electronic device 300B displays a reply interface 605 similarly comprising the electronic viewfinder 602 and associated meta data input field 603. The interface 605 comprises a post control 606 for the submission of the further visual media and associated meta data 503.

As is substantially illustrated in FIG. 6, the process of bidirectional communication may repeat indefinitely wherein a further notification 607 is again sent to the first electronic device 300A, similarly displayed by way of an alert 608 in substantial real-time allowing the first user to again input yet further visual media and associated meta data 503.

In alternative embodiments, the interface 605 of the second electronic device 300B may comprise the contact selection control 604 allowing the second user to select a third user associated with the third electronic device 300C for example. In this way, a further notification would be sent to the third electronic device 300C allowing the third user to capture yet further visual media.

At the end of the visual media capture process, whether two visual media are captured or more, at step 507, the first visual media 609 and the further visual media 610 are uploaded to the server 401 which creates a linked image post object at step 508 comprising both the first and further visual media 609, 610 and associated meta data 503.

Figure 7:
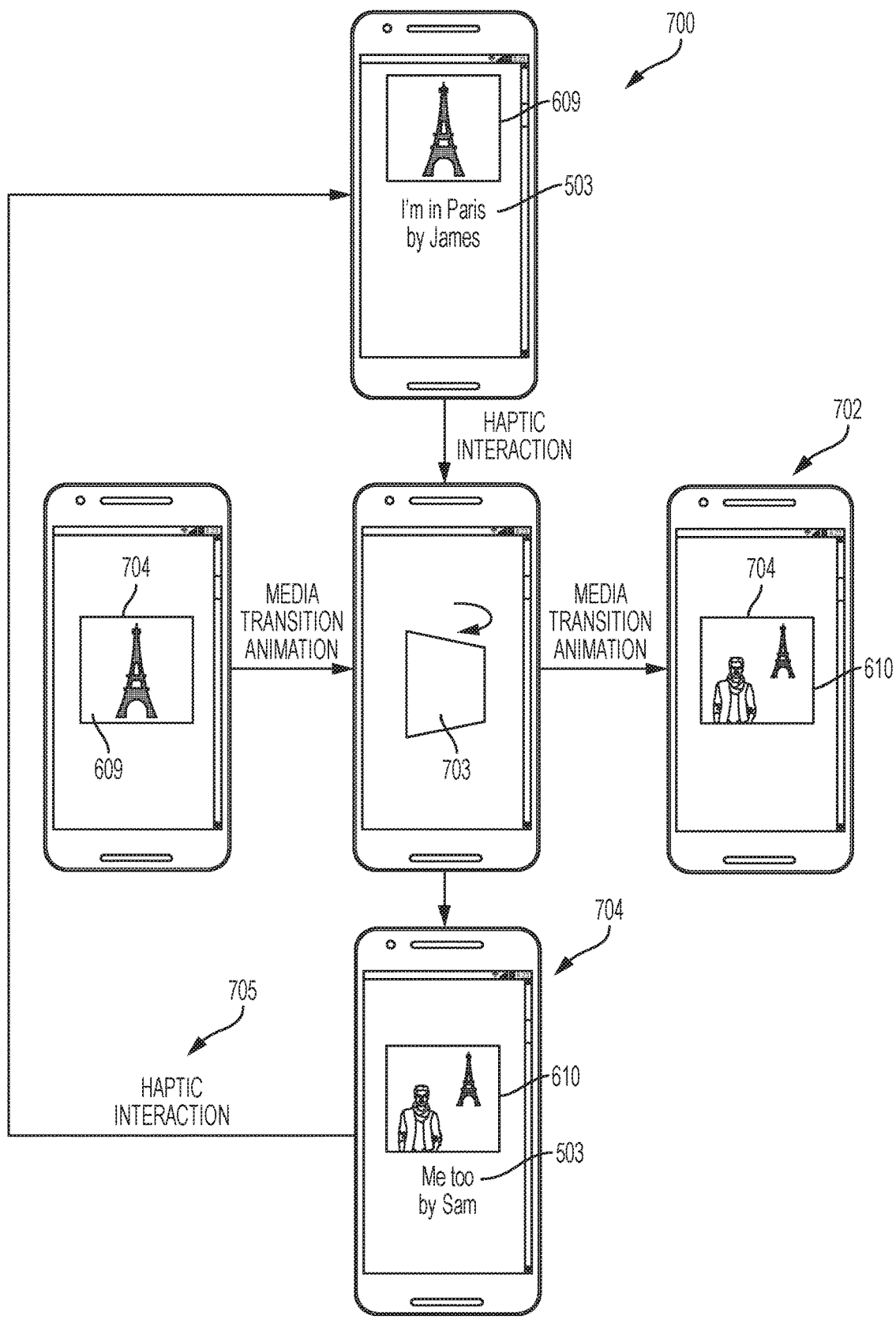
FIG. 7 illustrates visual media transition animations for the display of linked visual media in accordance with an embodiment.

For the linked image post object, at step 509, the display controller 306 is able to generate the exemplary graphical interface 700 shown in FIG. 7 using the display device 302 showing the linked image post.

The interface 700 comprises the display of data comprising the first visual media 609 and any associated meta data 503.

At step 510, the electronic device 300 receives a haptic interaction 510 with the first visual media 609 using the touch controller 303. The display controller 306 registers the haptic interaction with the first visual media 609 and then initiates the visual media transition animation 702 shown in FIG. 7, 8 or 9.

The visual media transition animation 702 comprises the replacement of the first visual media 600 with the second visual media 610 in place at the same display location. In other words, the user does not need to scroll, browse to a different page or the like to view the reply further visual media 610 associated with the first visual media 609.

Figure 8:
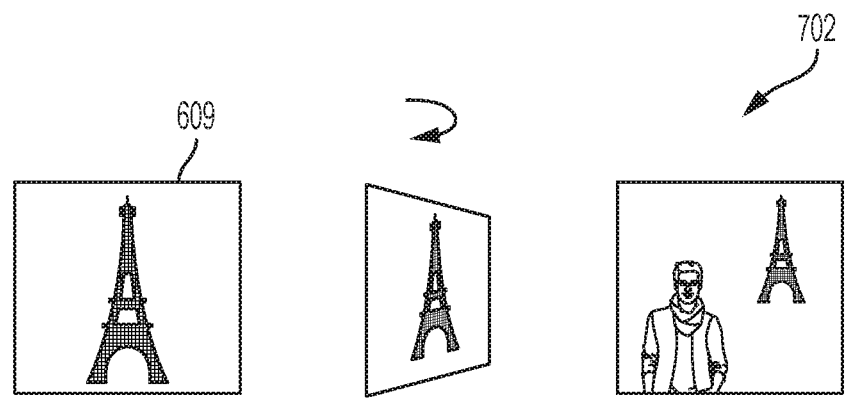
FIG. 8 illustrates a first visual media transition in accordance with an embodiment for two visual media objects in accordance with an embodiment.

The visual media transition animation 702 may comprise a flip animation 703 as is substantially illustrated in FIG. 8 wherein the image field 704 rotates around a vertical axis to appear to display the further visual media 610 there behind.

FIG. 7 shows the updated interface 704 after the animation 702 which comprises the further visual media 610 and any associated meta data 503.

In embodiments, the process may be repeated indefinitely by further haptic interactions 705 to continuously transition between the first and second visual media 609, 610.

The embodiment illustrated in FIG. 7 illustrates a flip type visual media transition animation 702 for two visual media.

However, as alluded to above, more than two visual media may be associated within the linked image post object. For example, the first and second users or alternatively the third user of the third electronic device 300C may generate yet further visual media.

As such, at step 511, the display controller 306 may determine the number of visual media associated within the linked object. Should the display controller 306 determined that the linked object comprises more than two visual media, the display controller 306 may display a further visual media graphical user interface and a further visual media transition animation at steps 512 and 513.

Figure 9:
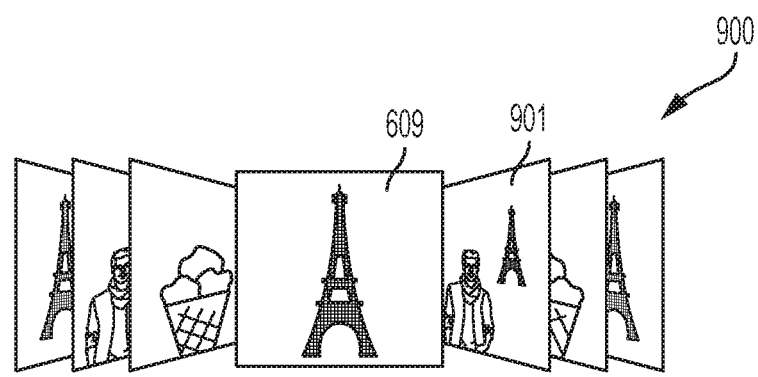
FIG. 9 illustrates a further visual media transition for more than two visual media objects in accordance with an embodiment.

Specifically, FIG. 9 illustrates the further visual media transition animation 900 allowing the user to shuffle left and right between the first visual media 609 and the yet further visual media 101.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method involving:
   electronic devices each comprising a respective processor and memory device, digital image sensor, haptic electronic display device operably coupled thereto, the memory device comprising:
   a media capture controller to capture visual media using the digital image sensor;
   a display controller to display the visual media and a contact selection control; and
   a messaging controller to send a communication for another electronic device according to an identifier selected using the contact selection control; and
   a social media server in operable communication with the electronic devices;
   wherein the method comprises:
   two electronic devices communicating with each other to capture at least three visual media in turn, wherein a first electronic device captures first visual media, a second electronic device captures second visual media in response to a first communication from the first electronic device and the first electronic device captures third visual media in response to a second communication from the second electronic device; and
   the social media server
   generates a linked visual media post object according to the first, second and third visual media, which, when displayed
   on a haptic electronic display device as a linked visual media post, is responsive to haptic interactions therewith to display
   a visual media animation to transition through each of the first, second and third visual media.

2. The method as claimed in claim 1, wherein the visual media animation transition comprises a flip type visual media animation transition having the appearance of the first visual media rotating about an axis to reveal at least one of the second and third visual media from behind.

3. The method as claimed in claim 1, wherein meta data is recorded via respective interfaces of the two electronic devices for each visual media and wherein the meta data is displayed with respective visual media in the linked visual media post.

4. The method as claimed in claim 1, wherein the communication is a push notification.

5. The method as claimed in claim 1, wherein the media capture controller displays a graphical user interface comprising a live image sensor view.

6. The method as claimed in claim 5, wherein the graphical user interface further comprises a meta data input field for receiving meta data in relation to the visual media.

7. The method as claimed in claim 1, wherein, the method further comprises at least one of the two electronic devices selecting a third electronic device using a respective contact selection control thereof and the at least one of the two electronic devices communicating with the third electronic device to capture fourth visual media and wherein the social media server updates the linked visual media post according to the fourth visual media.

8. The method as claimed in claim 7, wherein the visual media animation
   substitutes the display of the first visual media with at least one of the second and the third of the at least three visual media substantially in place within the same display region of the respective electronic display device.

9. The method as claimed in claim 8, wherein the visual media animation comprises a shuffle type visual media animation transition having the appearance of the first, second and third visual media moving in line to bring one of the first, second and third visual media forward.

* * * * *